Dec. 23, 1930.    G. J. ROSCH    1,786,265
GATE BOLT
Filed March 14, 1929
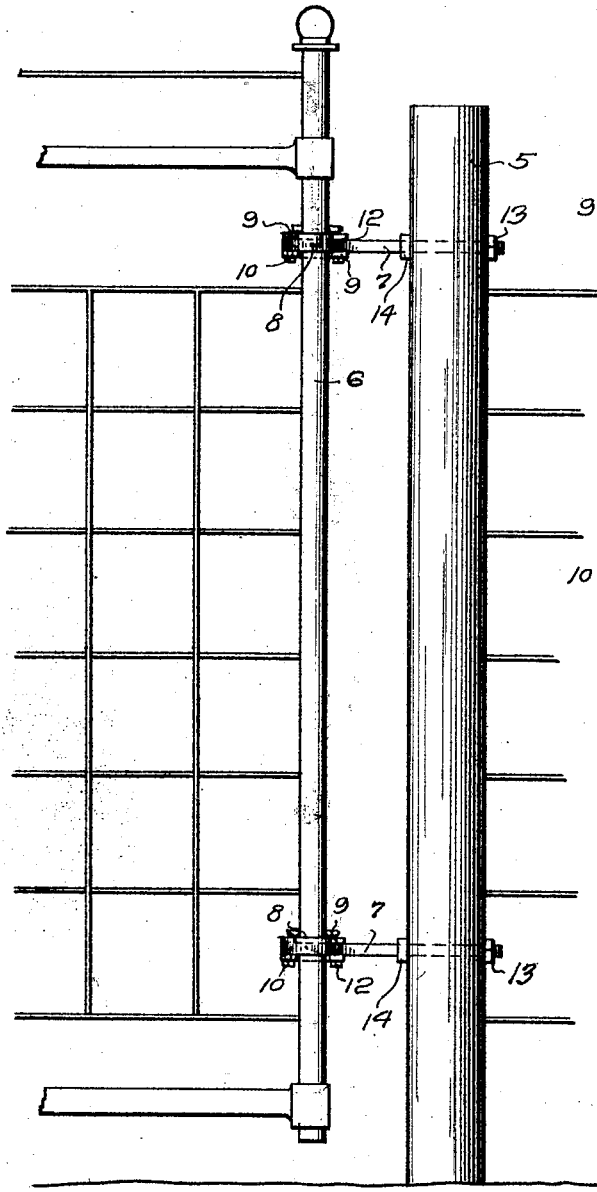
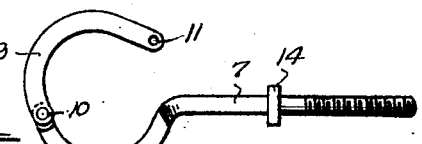
Fig. 2.
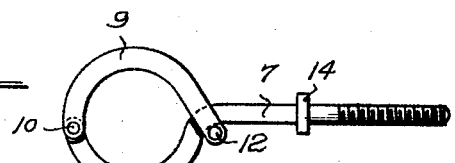
Fig. 3.
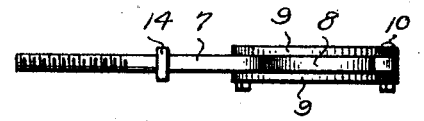
Fig. 4.
Fig. 1.
Inventor
George J. Rosch,
By Samuel Herrick,
Attorney Patented Dec. 23, 1930

1,786,265

UNITED STATES PATENT OFFICE

GEORGE J. ROSCH, OF MARCUS, IOWA

GATE BOLT

Application filed March 14, 1929. Serial No. 347,052.

This invention relates to gate bolts, and it has for its object to provide a bolt adapted to be substituted for the ordinary eye bolts, used on farm gates. Metal farm gates have come into almost universal use, in late years. These gates comprise a metallic frame which supports a woven wire body. The rear members of the frames of the gates, which lie in parallelism with the gate post, are usually of elongated, cylindrical form, the gate, as a whole, being hingedly connected to the gate post by eye bolts, the eyes of which embrace the rear member of the frame of the gate, and the shanks of which pass through the body of the post. Under this old arrangement, it is necessary to dismantle the whole gate, if any replacement of the bolts becomes necessary. According to the present invention, the heads or eyes of the bolts are made in separable parts, and a broken part may be easily and quickly replaced without disturbing the position of the gate.

In the accompanying drawing,

Fig. 1 is a view of a fragment of a fence, and gate, illustrating the bolt of the present invention.

Fig. 2 is a plan view of the bolt in open position,

Fig. 3 is a plan view of the bolt in closed position, and

Fig. 4 is a rear elevation of the bolt.

Like numerals designate corresponding parts in all of the figures of the drawing.

In the drawing, 5 designates the gate post and 6 the rear frame member of a metal gate. The bolt of the present invention comprises a shank 7, a substantially semi-circular head 8, and a pair of separate fingers 9, which are pivoted to the head 8, at 10, and are provided with aligning openings 11, which are adapted to receive a counter-sunk bolt 12. The shanks 7 traverse the body of the post 5, in the usual way, and are provided with nuts 13, for resisting outward movement. If desired, these bolts may be provided with collars 14, for limiting their movement through the posts, or the elements 14 may be loose on the bolts, so that as the nuts 13 are tightened, the fingers 9 may be drawn up against the washer-like elements 14.

When used in this fashion, these members serve to frictionally bind the rear member 6, of the gate, so that the gate may be moved to any desired position, and remain in the position in which it is placed. However, ordinarily the gate will be left to swing free in the hinge created by the bolts and the circular member 6, which they engage. To this end the portion 8 is so formed that its upper face lies flush with the upper face of the upper finger 9, so that pins 13 passed through member 6 of the gate to adjust the height of the gate, will ride upon a flush surface.

It is to be understood that the invention is not limited to the precise construction set forth, but that it includes, within its purview, whatever changes fairly come within either the terms or the spirit of the appended claims.

Having described my invention, what I claim is:

1. A device of the character described, comprising a threaded shank of a length to traverse a gate post, which shank terminates in a curved head and a loose part pivoted to said head which, complementally with said head, provides means adapted to embrace the vertical frame member of the gate, means for holding said loose part in embracing position and a gate carried part riding upon the upper face of said device in the movement of the gate and serving to hold the gate against downward movement therethrough.

2. The combination with a gate, comprising a rear vertical member, a gate post and means for supporting the gate from the gate post comprising a shank of a length to traverse the gate post and having its rear end threaded for the reception of a binding nut, which shank terminates in a curved head, a pair of curved fingers, one above and below said head, pivoted to said head, a pin traversing the outer ends of said fingers adapted to engage behind the body portion of the bolt, and a horizontally disposed pin traversing the rear vertical member of the gate and riding upon the upper face of the said supporting means in the movement of the gate.

In testimony whereof I affix my signature.

GEORGE J. ROSCH.